United States Patent
Stabel et al.

(10) Patent No.: US 9,390,817 B2
(45) Date of Patent: Jul. 12, 2016

(54) FUEL ASSEMBLY FOR A PRESSURIZED WATER REACTOR

(75) Inventors: Jürgen Stabel, Erlangen (DE); Hans-Joachim Lippert, Höchstadt (DE); Mingmin Ren, Erlangen (DE); Bernd Dressel, Erlangen (DE)

(73) Assignee: Areva GmbH, Erlangen (DE)

( * ) Notice: Subject to any disclaimer, the term of this patent is extended or adjusted under 35 U.S.C. 154(b) by 1309 days.

(21) Appl. No.: 12/020,918

(22) Filed: Jan. 28, 2008

(65) Prior Publication Data
US 2008/0159466 A1    Jul. 3, 2008

Related U.S. Application Data

(63) Continuation of application No. PCT/EP2006/006465, filed on Jul. 4, 2006.

(30) Foreign Application Priority Data

Jul. 26, 2005   (DE) .................. 10 2005 035 486

(51) Int. Cl.
*G21C 3/32* (2006.01)
*G21C 3/322* (2006.01)

(52) U.S. Cl.
CPC ............ *G21C 3/322* (2013.01); *G21Y 2002/303* (2013.01); *G21Y 2004/302* (2013.01); *G21Y 2004/305* (2013.01); *Y02E 30/32* (2013.01); *Y02E 30/38* (2013.01)

(58) Field of Classification Search
CPC ............. G21C 3/322; G21Y 2002/303; G21Y 2004/302; G21Y 2004/305; Y02E 30/32; Y02E 30/38
USPC ........................................... 376/438, 462, 448
See application file for complete search history.

(56) References Cited

U.S. PATENT DOCUMENTS

| | | | | |
|---|---|---|---|---|
| 4,804,516 | A | * | 2/1989 | Thomazet et al. ............ 376/439 |
| 4,844,861 | A | * | 7/1989 | Leclercq ...................... 376/439 |
| 4,879,090 | A | * | 11/1989 | Perrotti et al. ................ 376/462 |
| 4,970,048 | A | | 11/1990 | Noailly |
| 5,949,839 | A | * | 9/1999 | Nylund ........................ 376/438 |
| 2003/0147487 | A1 | | 8/2003 | Nylund |
| 2004/0032925 | A1 | * | 2/2004 | Meier et al. .................. 376/439 |
| 2005/0238131 | A1 | | 10/2005 | Hellandbrand, Jr. et al. |
| 2006/0285628 | A1 | | 12/2006 | Stabel et al. |

FOREIGN PATENT DOCUMENTS

| | | |
|---|---|---|
| CN | 85109766 A | 7/1986 |
| EP | 0 185 219 A1 | 6/1986 |
| EP | 1 589 539 A2 | 10/2005 |
| JP | 61191990 A | 8/1986 |
| JP | 62073295 U | 5/1987 |
| WO | 2005/059924 A2 | 6/2005 |

\* cited by examiner

*Primary Examiner* — Frank J McGue
(74) *Attorney, Agent, or Firm* — Laurence A. Greenberg; Werner H. Stemer; Ralph E. Locher

(57) ABSTRACT

A fuel assembly for a pressurized water nuclear reactor includes a multiplicity of fuel rods which extend in a longitudinal direction and are guided in a plurality of spacers that are spaced apart from one another axially. The spacers of an upper region have a lower flow resistance in a transverse direction perpendicular to the longitudinal direction, than the spacers of a lower region.

17 Claims, 2 Drawing Sheets

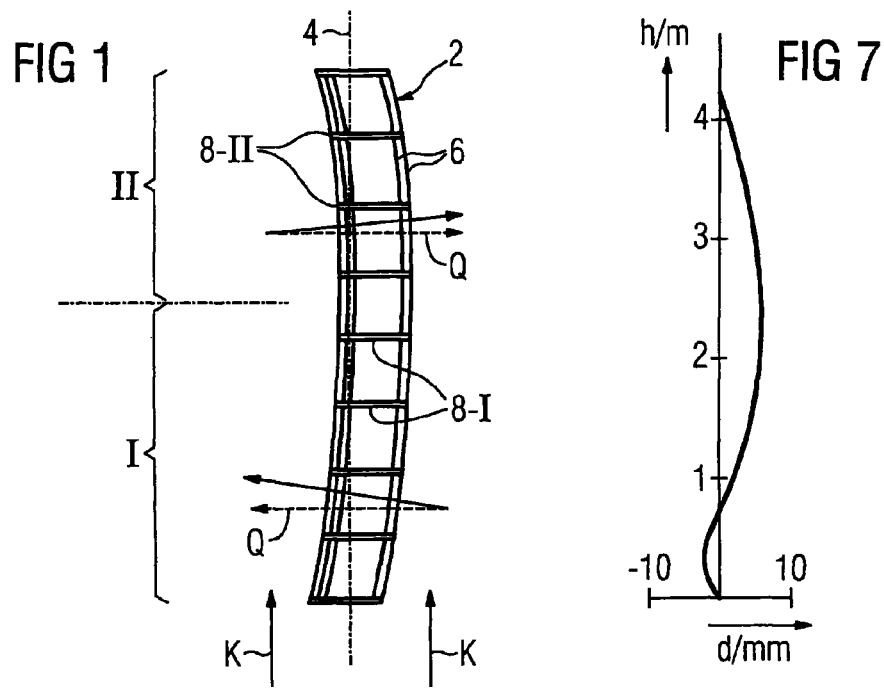
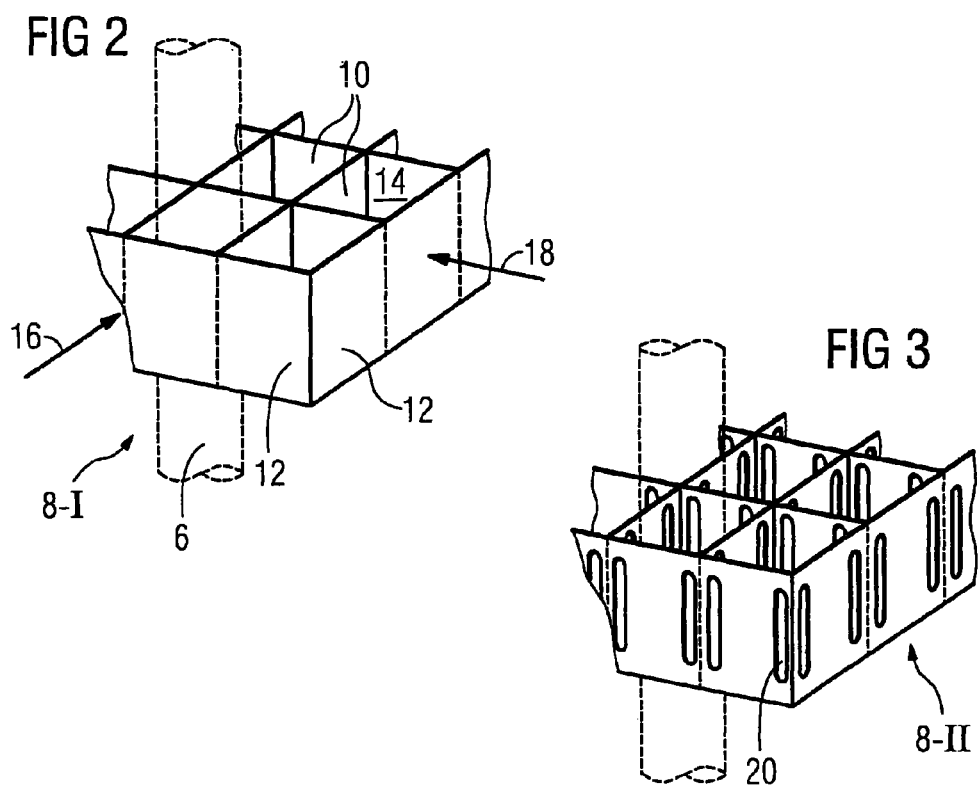

FUEL ASSEMBLY FOR A PRESSURIZED WATER REACTOR

CROSS-REFERENCE TO RELATED APPLICATIONS

This is a continuation application, under 35 U.S.C. §120, of copending International Application No. PCT/EP2006/006465, filed Jul. 4, 2006, which designated the United States; this application also claims the priority, under 35 U.S.C. §119, of German Patent Application DE 10 2005 035 486.6, filed Jul. 26, 2005; the prior applications are herewith incorporated by reference in their entirety.

BACKGROUND OF THE INVENTION

Field of the Invention

The invention relates to a fuel assembly for a pressurized water reactor.

It is known from a large number of inspection results that the fuel assemblies of a pressurized water reactor bend during their service life. The reasons therefor can, for example, be anisotropy in the thermal expansion or an increase in length of the fuel rod cladding tubes or the control rod guide tubes induced by radioactive radiation. In the worst case, those bends can result in sluggishness of the control rod guide tubes or in problems in exchanging fuel assemblies. However, besides systematic bends in certain positions in the core, increased or decreased cracks between the individual fuel assembles or between fuel assembles can be created in many cases in unknown locations in the core which are located on the edge of the core and the core baffle, which influence the fuel-moderator ratio.

Such a bending or deformation observed in practice is shown in the diagram of FIG. 7. In that diagram, the magnitude of the bending d measured in mm is plotted against the height h in m of the fuel assembly, measured from the lower rod holder plate, as is generated for example for an irradiated 18×18 fuel assembly. The figure shows that the bending in question is substantially a C-shaped curved bending (basic mode), which is superimposed to a certain extent with bends having higher modes, mainly with the next highest mode, in the form of an S-shaped bend. In order to decrease the extent of such bends, the prior art attempted to mechanically construct the fuel assemblies in a more stable manner and to decrease the hold-down forces.

Alternatively, International Publication No. WO 2005/059924 A2, corresponding to U.S. Patent Application Publication No. US 2006/0285628 A1, has proposed to purposely influence the forces acting on the fuel assemblies by using differently constructed edge webs so as to enable optimum construction of the core despite bending which occurs.

BRIEF SUMMARY OF THE INVENTION

It is accordingly an object of the invention to provide a fuel assembly for a pressurized water reactor, which overcomes the hereinafore-mentioned disadvantages of the heretofore-known devices of this general type and which exhibits decreased bending during operation.

With the foregoing and other objects in view there is provided, in accordance with the invention, a fuel assembly for a pressurized water reactor. The fuel assembly comprises upper and lower regions, a plurality of mutually axially separated spacers disposed in the upper and lower regions, and a multiplicity of fuel rods extended in a longitudinal direction and guided in the spacers. The spacers of the upper region have a lower flow resistance (cross-flow resistance) in a transverse direction perpendicular to the longitudinal direction than the spacers of the lower region.

The invention is based on the observation that the cooling water flowing in the longitudinal or axial direction of the fuel assembly is influenced by the substantially C-shaped curved bending of the cross-flow components of the fuel assembly described above. These cross-flow components which run perpendicular to the vertical are in the lower region of the fuel assembly, that is in the region in which, as viewed from the direction of the flowing cooling water, the extent of the bend, i.e. the departure from an ideal vertical line, increases as opposed to the cross-flow components which adjust due to the decreasing bending in the region above the maximum bending.

In accordance with another especially simple advantageous feature of the invention, a spacer having an edge which is formed by edge webs effects the different cross-flow resistances of the spacers of the upper and lower region in such a way that the edge webs of the spacers of the upper region, as viewed in a transverse direction, cover a smaller area than the edge webs of the spacers of the lower region. This results in a significantly decreased cross-flow resistance of the spacers in the upper region.

In accordance with a further preferred feature of the invention, in a spacer which is constructed from a plurality of intersecting inner webs, the inner webs of the spacers of the upper region, as viewed in a transverse direction, also cover a smaller area than the inner webs of the spacers of the lower region. Using this measure, the "transparency" of the spacers of the upper region is additionally increased with respect to the "transparency" of the spacers of the lower region.

Basically, the smaller area coverage can result from the fact that the height of the respective edge webs or inner webs of the spacers of the upper region is smaller than the height of the respective edge webs or inner webs of the spacers of the lower region.

In accordance with a concomitant feature of the invention, alternatively or in addition, the edge webs and possibly the inner webs of the spacers of the upper region are provided with openings which are larger than openings that are possibly present in the edge webs and the inner webs of the spacers of the lower region. Basically, however, another embodiment is conceivable in which exclusively the edge webs and possibly also the inner webs of the upper region are provided with openings.

Other features which are considered as characteristic for the invention are set forth in the appended claims.

Although the invention is illustrated and described herein as embodied in a fuel assembly for a pressurized water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a basic diagrammatic, side-elevational view of a bent, deflected or sagging fuel assembly;

FIGS. 2 and 3 are fragmentary, perspective views of respective lower and upper regions of a spacer according to the invention;

FIG. 7 is a diagram in which bending, deflection or sagging d is plotted against height h of the fuel assembly.

DETAILED DESCRIPTION OF THE INVENTION

Figure 4:
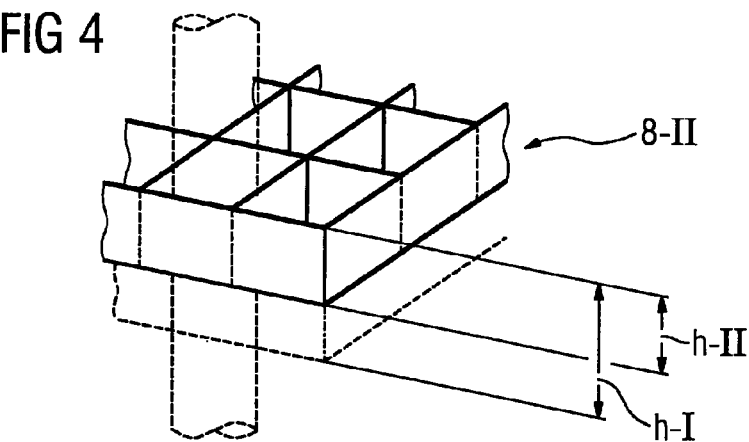
FIG. 4 is another fragmentary, perspective view of an upper region of a spacer.

Referring now to the figures of the drawings in detail and first, particularly, to FIG. 1 thereof, there is seen a fuel assembly 2 of a pressurized water reactor in which a multiplicity of fuel rods 6 that extend in an axial or longitudinal direction 4 are guided in a plurality of mutually axially separated spacers 8-I, 8-II. A deformation in the form of a C-shaped curved bending, deflection or sagging in an operating condition includes an elastic part and a part that becomes increasingly plastic with increasing operating time. Since the fuel assembly 2 is not surrounded by a casing or box, cooling water K flowing at the fuel assembly 2 can flow along upward between adjacent fuel assemblies between adjacent spacers 8-I, 8-II in the fuel assembly 2 and enable a desired horizontal cross-exchange of cooling water.

In the fuel assembly 2, which is bent in the shape of a (backward or mirror-reversed) C, systematic cross currents Q which are generated due to its bent shape, are opposed in a lower region I by cross currents Q generated in an upper region II. While the cross currents created in the lower region I exert a force on the fuel assembly 2 that results in reducing the amount of bending in this lower region I, the opposing cross currents Q produce an increase in bending so that in practice the superimposition of the C-shaped arcuate bend described above by using FIG. 7 takes the form of an S-shaped deformation.

These cross currents occurring in the upper region II of the fuel assembly 2 consequently lead to an unstable behavior because their extent increases as do the forces exerted by them on the fuel assembly 2 with increasing bending.

The invention is thus based on the concept that the amount of forces created in the upper region II and the resulting tendency toward instability and toward creating a plastic deformation can be decreased if care is taken to subject the spacers 8-II provided in the upper region II of the cross current Q to a lower flow resistance than the spacers 8-I located in the lower region I. In other words: in the case of the lower spacers 8-I, a higher resistance against cross currents is advantageous since the forces generated by these cross currents decrease bending, while the cross forces exerted in the upper region II on the spacers 8-II should be as low as possible in order to minimize their influence on the amount of bending.

FIG. 1 shows a situation in which the border between the upper region I and the lower region II does not run exactly in the middle of the fuel assembly 2 so that in the embodiment using nine spacers 8-I, 8-II, the five lower spacers 8-I are assigned to the lower region I and the remaining four spacers 8-II are assigned to the upper region II. The border between the lower region I and the upper region II differs installation dependently from fuel assembly type to fuel assembly type, and should be located approximately in the region of maximum bending.

According to FIG. 2, a spacer 8-I of the lower region I is constructed from a plurality of intersecting or crossing inner webs 10. The edge of the spacer 8-I is formed by an edge web 12. The intersecting inner webs 10 and edge webs 12 form square grid cells 14, through which the fuel rods 6 are guided. In the simplified representation of the figure, nubs and spring elements disposed on the inner webs 10 and the edge webs 12 for storage of the fuel assemblies and, if necessary, existing guide or twist vanes or in double wall spacers axially running flow channels, are not shown from reasons of clarity.

The figure shows that the edge webs 12 and the inner webs 10 of the spacer 8-I of the lower region are closed, i.e. it contains no access openings and, viewed in this way in each transverse direction 16, 18, they cover a large surface and impart a high flow resistance so that the vertically flowing cooling water exerts a high transverse force as a result of the bending of the fuel assembly generated by the inclination or skewing of one of the edge webs against the streaming cooling water, to compensate for this bending.

On the other hand, in the case of FIG. 3, both the inner webs 10 and the edge webs 12 of a spacer 8-II of the upper region are provided at the same usual overall height with openings 20 which result in a lower flow resistance in a transverse direction with respect to the spacer 8-I (FIG. 2), and permit a cross current of the cooling water in the spacer 8-II as well, so that the transverse forces exerted by the cooling water on the spacers 8-II can be correspondingly decreased.

Alternatively to the embodiment shown in FIG. 3, a reduced degree of coverage of a spacer 8-II of the upper region can also be achieved according to FIG. 4 in such a way that the height h-II of the inner and edge webs 10 and 12 is decreased. The decreased height h-II is illustrated in the figure by using the spacer 8-I (drawn in a dotted line) of the lower region with a greater height h-I.

Figure 5:
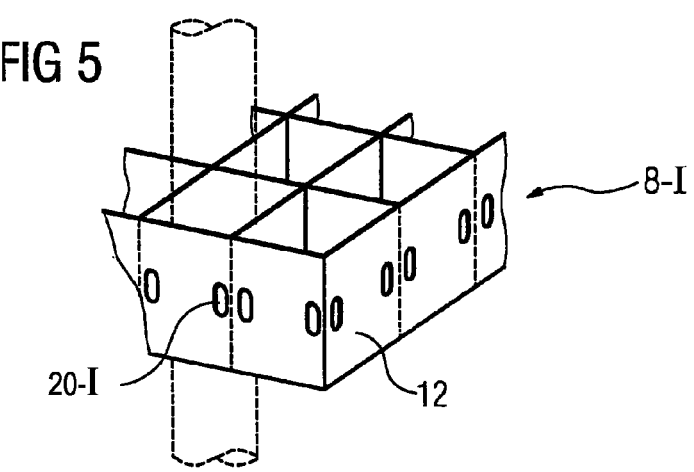
FIGS. 5 and 6 are simplified, fragmentary, perspective views of respective lower and upper regions of a spacer.
Figure 6:
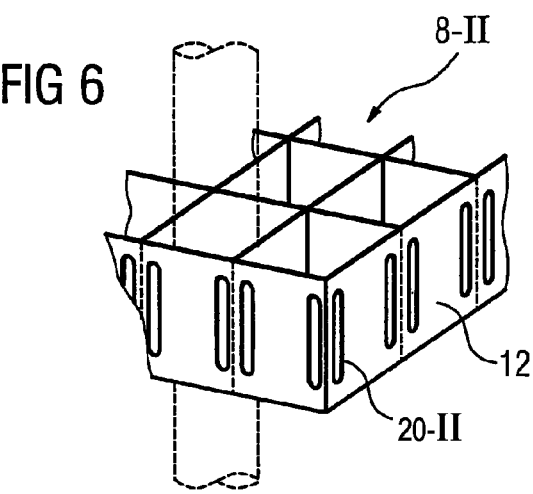

In the embodiment according to FIGS. 5 and 6, both the spacers 8-I of the lower region and the spacers 8-II of the upper region are provided with openings 20-I and 20-II in the edge webs 12. In this case the areas of the openings 20-II of the spacer 8-II of the upper region are greater than the areas of the openings 20-I of the spacer 8-I of the lower region. In addition to the embodiments shown in FIGS. 5 and 6, the inner webs 10 can also be provided with openings, and in this case the openings provided in the inner webs of the spacer of the lower region are smaller than the openings provided in the inner webs of the spacer 8-II of the upper region.

The invention claimed is:

1. A fuel assembly for a pressurized water reactor, the fuel assembly comprising:
    upper and lower adjoining regions as a whole extending over the entire fuel assembly;
    a plurality of mutually axially separated spacers disposed in said upper region and a plurality of mutually axially separated spacers disposed in said lower region;
    a multiplicity of fuel rods extended in a longitudinal direction and guided in said spacers; and
    each of said spacers of said upper region having a lower flow resistance in a transverse direction perpendicular to said longitudinal direction than each of said spacers of said lower region.

2. The fuel assembly according to claim 1, wherein said spacers have a lateral edge formed by edge webs, and said edge webs of said spacers of said upper region cover a smaller area than said edge webs of said spacers of said lower region, in said transverse direction.

3. The fuel assembly according to claim 2, wherein said spacers include a plurality of intersecting inner webs, and said inner webs of said spacers of said upper region cover a smaller area than said inner webs of said spacers of said lower region, in said transverse direction.

4. The fuel assembly according to claim 2, wherein only said spacers of said upper region have openings formed in said edge webs.

5. The fuel assembly according to claim 3, wherein only said spacers of said upper region have openings formed in said edge webs.

6. The fuel assembly according to claim 2, wherein said edge webs of all of said spacers have openings formed therein, and a total area of said openings in said edge webs of said spacers of said upper region is larger than a total area of said openings in said edge webs of said spacers of said lower region.

7. The fuel assembly according to claim 3, wherein said edge webs of all of said spacers have openings formed therein, and a total area of said openings in said edge webs of said spacers of said upper region is larger than a total area of said openings in said edge webs of said spacers of said lower region.

8. The fuel assembly according to claim 3, wherein only said spacers of said upper region have openings formed in said inner webs.

9. The fuel assembly according to claim 5, wherein only said spacers of said upper region have openings formed in said inner webs.

10. The fuel assembly according to claim 7, wherein only said spacers of said upper region have openings formed in said inner webs.

11. The fuel assembly according to claim 2, wherein said spacers have inner webs, and only said spacers of said upper region have openings formed in said inner webs.

12. The fuel assembly according to claim 4, wherein wherein said spacers have inner webs, and only said spacers of said upper region have openings formed in said inner webs.

13. The fuel assembly according to claim 6, wherein wherein said spacers have inner webs, and only said spacers of said upper region have openings formed in said inner webs.

14. The fuel assembly according to claim 3, wherein said inner webs of all of said spacers have openings formed therein, and a total area of said openings in said inner webs of said spacers of said upper region is larger than a total area of said openings in said inner webs of said spacers of said lower region.

15. The fuel assembly according to claim 5, wherein said inner webs of all of said spacers have openings formed therein, and a total area of said openings in said inner webs of said spacers of said upper region is larger than a total area of said openings in said inner webs of said spacers of said lower region.

16. The fuel assembly according to claim 7, wherein said inner webs of all of said spacers have openings formed therein, and a total area of said openings in said inner webs of said spacers of said upper region is larger than a total area of said openings in said inner webs of said spacers of said lower region.

17. The fuel assembly according to claim 8, wherein said inner webs of all of said spacers have openings formed therein, and a total area of said openings in said inner webs of said spacers of said upper region is larger than a total area of said openings in said inner webs of said spacers of said lower region.

* * * * *